United States Patent
Xie

(10) Patent No.: US 10,309,621 B2
(45) Date of Patent: Jun. 4, 2019

(54) AUTOMOBILE LED HEADLAMP

(71) Applicant: Shenzhen Aurora Technology Co., Ltd., Shenzhen, Guangdong (CN)

(72) Inventor: Qingbo Xie, Guangdong (CN)

(73) Assignee: SHENZHEN AURORA TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/745,116

(22) PCT Filed: Sep. 28, 2017

(86) PCT No.: PCT/CN2017/103987
§ 371 (c)(1),
(2) Date: Jan. 15, 2018

(87) PCT Pub. No.: WO2018/095137
PCT Pub. Date: May 31, 2018

(65) Prior Publication Data
US 2019/0017684 A1  Jan. 17, 2019

(30) Foreign Application Priority Data

Nov. 22, 2016 (CN) .................... 2016 2 1270128 U

(51) Int. Cl.
*B60Q 1/04* (2006.01)
*F21S 41/19* (2018.01)
(Continued)

(52) U.S. Cl.
CPC ............ *F21V 17/12* (2013.01); *B60Q 1/0433* (2013.01); *F21S 41/192* (2018.01); *F21S 45/47* (2018.01);
(Continued)

(58) Field of Classification Search
CPC .......... F21V 17/12; F21V 29/74; F21V 19/00; F21V 23/00; B60Q 1/0433; F21Y 2115/10
See application file for complete search history.

(56) References Cited

U.S. PATENT DOCUMENTS 9,480,141 B1 * 10/2016 Hamadeh ............. H05K 1/0206
2006/0002125 A1 * 1/2006 Kim .......................... F21K 9/00
362/509
(Continued)

FOREIGN PATENT DOCUMENTS

| CN | 204026435 U | 12/2014 |
| CN | 204853240 U | 12/2015 |

(Continued)

OTHER PUBLICATIONS

Fan, CN 205332043, Jun. 22, 2016, Abstract and Figures (Year: 2016).*

(Continued)

*Primary Examiner* — Mary Ellen Bowman
(74) *Attorney, Agent, or Firm* — Hamre, Schumann, Mueller & Larson, P.C.

(57) ABSTRACT

An automobile LED headlamp, comprising a stem, an LED module and a heat dissipation module, wherein, the LED module is mounted on the stem; the heat dissipation module comprises a fixing element and a plurality of heat dissipation strips, the fixing element is fixedly connected to one end of the stem, each of the heat dissipation strips is fixed to the fixing element, and each of the heat dissipation strips is distributed radially. The arrangement of the heat dissipation module is configured to enhance the heat dissipation capability, each heat dissipation strip is fixed on the fixing element in a annular and radial distribution, the heat dissi- (Continued)

pation area is maximized, the air convection speed is faster, and the heat dissipation is accelerated.

9 Claims, 3 Drawing Sheets

(51) Int. Cl.
    *F21S 45/47*     (2018.01)
    *F21V 17/12*     (2006.01)
    *F21V 19/00*     (2006.01)
    *F21V 23/00*     (2015.01)
    *F21V 29/74*     (2015.01)
    *F21V 29/77*     (2015.01)
    *F21V 29/83*     (2015.01)
    *F21S 41/141*     (2018.01)
    *F21S 41/151*     (2018.01)
    *F21Y 107/90*     (2016.01)
    *F21Y 115/10*     (2016.01)

(52) U.S. Cl.
    CPC .............. *F21V 19/00* (2013.01); *F21V 23/00* (2013.01); *F21V 29/74* (2015.01); *F21V 29/77* (2015.01); *F21V 29/83* (2015.01); *F21S 41/141* (2018.01); *F21S 41/151* (2018.01); *F21Y 2107/90* (2016.08); *F21Y 2115/10* (2016.08)

(56) References Cited

U.S. PATENT DOCUMENTS

| | | | | |
|---|---|---|---|---|
| 2014/0022782 | A1* | 1/2014 | Tessnow | F21S 41/19 362/235 |
| 2015/0204521 | A1* | 7/2015 | Zhang | F21V 23/06 362/294 |
| 2015/0354776 | A1* | 12/2015 | Lai | F21V 29/51 362/487 |

FOREIGN PATENT DOCUMENTS

| | | |
|---|---|---|
| CN | 205332043 U | 6/2016 |
| CN | 206247200 U | 6/2017 |

OTHER PUBLICATIONS

International Search Report and Written Opinion issued in PCT/CN2017/103987 dated Nov. 15, 2017.

* cited by examiner

AUTOMOBILE LED HEADLAMP

TECHNICAL FIELD

The present application relates to the technical field of automobile lamps, and more particularly relates to an automobile LED headlamp.

BACKGROUND

In recent years, automobile headlamps have gradually changed from halogen headlamps and hernia headlamps to LED headlamps, which sufficiently demonstrates the advantages of the LED headlamps such as small sizes, attractive appearances, etc., however, an LED headlamp itself has a high demand for heat dissipation, if the heat dissipation is not good, it will cause the LED to decay and affect the life of the LED. Currently, most LED headlamps on the market adopt fan-typed active heat dissipation and passive heat dissipation using heat dissipation fins. Among them, the fan-typed heat dissipation has a good heat dissipation effect and can achieve a greater power, however, a service life of the lamp is limited by the fan, and the LED array may be burnt out once the fan fails; the fin-typed heat dissipation has a good stability of heat dissipation, but there is not enough space inside an automobile headlamp to make larger heat dissipation fins, therefore, the power of the LED headlamp cannot be further increased. Both the two methods of heat dissipation have their respectively inevitable shortcomings, which hinder the development of LED headlamps.

SUMMARY OF THE PRESENT APPLICATION

One object of the present application is to provide an automobile LED headlamp which can overcome the problem of the prior art that the LED headlamp used in an automobile has poor heat dissipation effect.

In order to solve the above technical problem, the technical solutions adopted in the embodiments of the present invention are described as follows.

Provided is an automobile LED headlamp, which comprises a stem and an LED module, wherein, the LED module is mounted on the stem; the automobile LED headlamp further comprises a heat dissipation module, the heat dissipation module comprises a fixing element and a plurality of heat dissipation strips, the fixing element is fixedly connected to one end of the stem, the heat dissipation strips are fixed to the fixing element, and the heat dissipation strips are distributed radially.

Preferably, each of the heat dissipation strips is a metal braid strip or a metal sheet.

Preferably, one end of each heat dissipation strip is fixed to the fixing element; or alternatively a middle portion of each heat dissipation strip in the longitudinal direction thereof is fixed to the fixing element.

Preferably, the fixing element comprises a fixing base and a fixing cover, the fixing base is fixedly connected with one end of the stem, and the fixing cover is fixedly connected with the fixing base; each of the heat dissipation strips locked and connected between the fixing base and the fixing cover by riveting, welding or fastener.

Preferably, one end of the stem is provided with a threaded hole, one end of the fixing base opposite to the fixing cover is provided with a threaded post, the threaded post is threadedly engaged into the threaded hole such that the fixing element is fixedly attached to the stem.

Preferably, the fixing cover is provided with a riveting post, the fixing base is provided with a riveting hole of which the position corresponds to the position of the riveting post, the riveting post is inserted into the riveting hole and riveted with the riveting hole such that the fixing cover is fixedly connected to the fixing base.

Preferably, the middle portion of the riveting post is provided with a through hole for a power line extending therethrough.

Preferably, the automobile LED headlamp further comprises a mounting bracket configured for connecting with an external component, a mounting hole is formed in the middle of the mounting bracket, the stem passes through the mounting hole, and the mounting bracket is fixedly connected with the stem through a first fastener.

Preferably, a side of the stem is provided with at least one recess, the LED module comprises a substrate and an LED array and a control module which are arranged on the substrate, the substrate is arranged in the recess and fixedly connected with the stem.

Preferably, the LED module further comprises a fixing block, the fixing block abuts against the substrate and fixedly connected to the stem through a second fastener.

Compared with the prior art, the automobile LED headlamp provided by the embodiments of the present application has the following beneficial effects: the arrangement of the heat dissipation module is configured to enhance the heat dissipation capability, each heat dissipation strip is fixed on the fixing element in a annular and radial distribution, that is, the planar design manner makes the heat dissipation strip have a wider contact area. In this way, the heat dissipation area is maximized, the air convection speed is faster, and the heat dissipation is accelerated. At the same time, the design of the power of the automobile LED headlamp will not be limited, and the service life of the automobile LED headlamp can still be ensured. In addition, you can also use a combination of a different number of heat dissipation strip to form a variety of structures of the heat dissipation module according to the actual demand, not only is the heat dissipation effect excellent, but also the use is flexible.

BRIEF DESCRIPTION OF THE DRAWINGS

In order to make the technical solutions in the embodiments of the present application clearer, the accompanying drawings to be used in the embodiments and the description of the prior art will be briefly introduced below. The drawings in the following description are merely some embodiments of the present application, and other embodiments will be appreciated by those skilled in the field without departing from the inventive nature of the invention.

The drawings are marked accordingly as follows:

| 1-first fastener | 2-second fastener | 10-stem |
| 11-recess | 20-LED module | 21-substrate |
| 22-LED array | 23-control module | 24-fixing block |

-continued

| 30-heat dissipation module | 31-fixing element | 32-heat dissipation strip |
| --- | --- | --- |
| 40-mounting bracket | 41-mounting hole | 50-power line |
| 311-fixing base | 312-fixing cover | 3111-riveting hole |
| 3112-threaded post | 3121-riveting post | 3122-through hole |

DETAILED DESCRIPTION OF THE EMBODIMENTS

Figure 1:
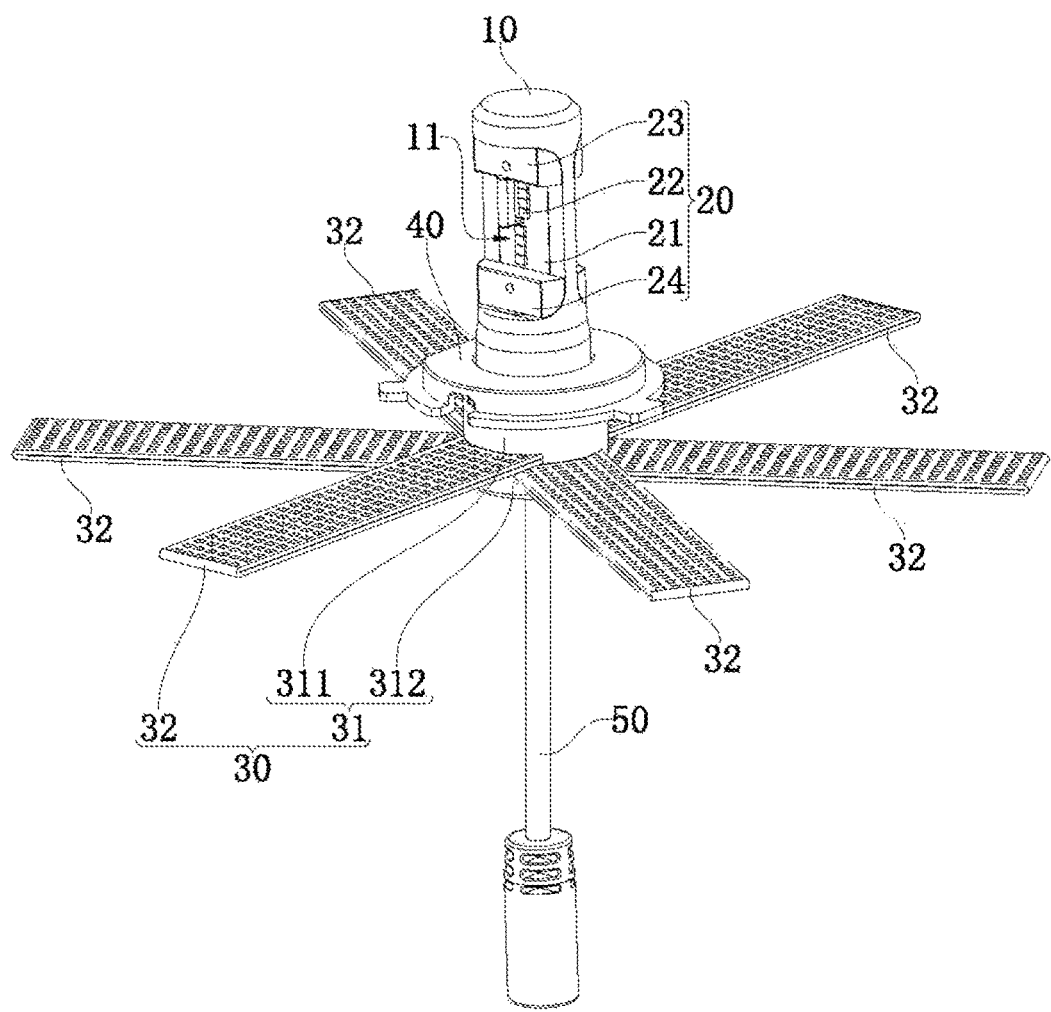
FIG. 1 is a perspective structural schematic view of an automobile LED headlamp according to one embodiment of the present application.
Figure 2:
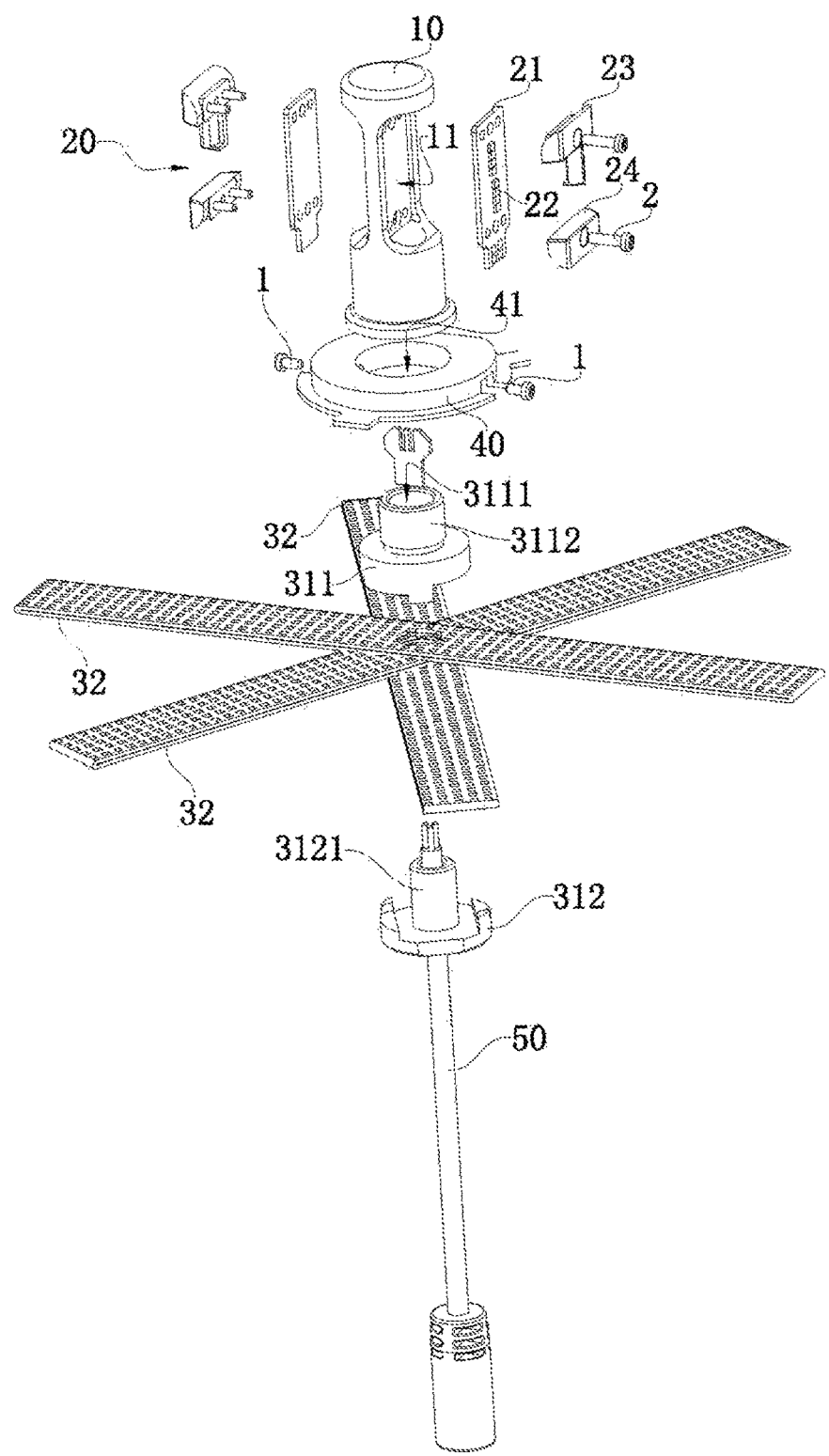
FIG. 2 is an exploded perspective structural schematic view of the automobile LED headlamp according to one embodiment of the present application.
Figure 3:
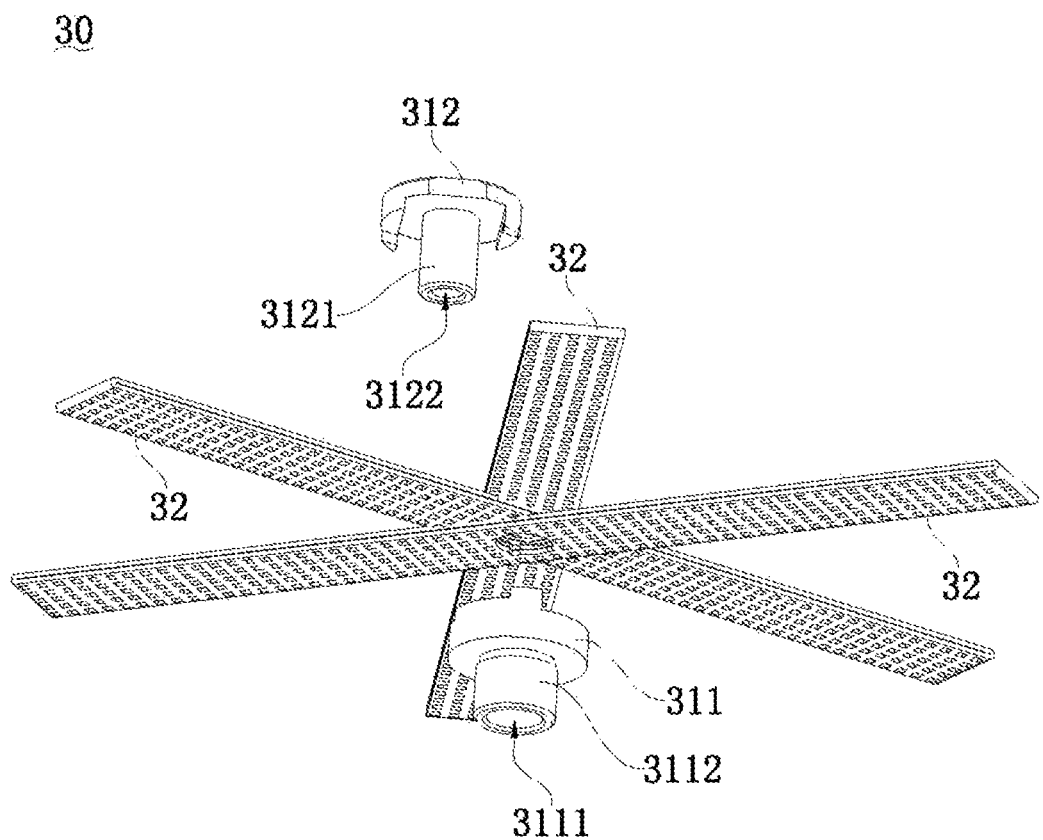
FIG. 3 is a perspective structural schematic view of a heat dissipation module of the automobile LED headlamp according to one embodiment of the present application.

The embodiment of the present application is described in detail below, and examples of said embodiments are shown in the drawings, where the same or similar labels represent the same or similar components or components having the same or similar functions. The embodiments described in the reference FIG. 1-3 are illustrative, which are intended to be explain the present application and cannot be construed as limiting the present application.

In the description of the present application, "length", "width", "upper", "lower", "front", "back", "left" and "right", "vertical", "horizontal", "top", "bottom", "inside", "outside" and other terms indicating the orientation or positional relationship are based on orientation or positional relationship shown in the drawings, only for the purpose of facilitating the description of the invention and simplifying the description, instead of indicating or implying that the indicated device or component must have a specific orientation and constructed and operated in a particular orientation, and therefore it cannot be construed as limiting the invention.

In addition, the terms "first" and "second" are for illustrative purposes only and should not be construed as indicating or implying a relative importance or implicitly indicating the number of technical features indicated. Therefore, a feature that defines "first" and "second" may expressly or implicitly include one or more of the features. In the description of the present application, "multiple" means two or more than two, unless otherwise particularly defined.

In the present application, "install", "interconnect", "connect", "fix" and other terms should be understood in a broad sense, such as a fixed connection, a detachable connection, or an integrated connection; a mechanical connection or an electrical connection; or direct connection, indirect connection via the medium, or internal connections of the two elements or the interaction relationship of two elements. The specific meaning of the above terms in the present application could be understood by those ordinary skilled in the field according to specific circumstances.

As showed in FIG. 1 to FIG. 3, an automobile LED headlamp according to embodiment of one present application, comprises a stem 10 and an LED module 20, wherein the LED module 20 is mounted on the stem 10; the automobile LED headlamp further comprises a heat dissipation module 30, the heat dissipation module 30 comprises a fixing element 31 and a plurality of heat dissipation strips 32, the fixing element 31 is fixedly connected to one end of the stem 10, the heat dissipation strips 32 are fixed to the fixing element 31, and the heat dissipation strips 32 are distributed radially. Particularly, the automobile LED headlamp according to the embodiment of the present application is configured to enhance the heat dissipation capability by the heat dissipation module 30, and each heat dissipation strip 32 is fixed on the fixing element 31 in a annular and radial distribution, that is, this planar design manner makes the heat dissipation strip 32 has a wider contact area. In this way, the heat dissipation area is maximized, the air convection speed is faster, and the heat dissipation is accelerated. At the same time, the design of the power of the automobile LED headlamp will not be limited, and the service life of the automobile LED headlamp can still be ensured. In addition, you can also use a combination of a different number of heat dissipation strip 32 to form a variety of structures of the heat dissipation module 30 according to the actual demand, not only is the heat dissipation effect excellent, but also the use is flexible.

It should be further noted that the design of the heat dissipation module 30 in the automobile LED headlamp of the embodiment forms active heat dissipation, which can effectively enhance the emission of the heat generated during the operation of the LED module 20, and is highly practical.

In addition, the number of the heat dissipation strips 32 of the heat dissipation module 30 may be any number, for example, ranged from 4 to 12. Particularly, the number of heat dissipation strips 32 may be four, six, eight, ten, or twelve, and may be set as needed. In this way, different sizes of lamps are formed to suit for different models, for example, the overall structure can be designed to be smaller or larger.

In the present embodiment, each of the heat dissipation strips 32 is a metal braid strip or a metal sheet. Particularly, the metal braid strip can be braided by a plurality of copper wires, and the advantages of the metal braid strip formed as the heat dissipation strip 32 are as follows: gaps will be formed between the copper wires, then the copper wire in such a gap can contact the air effectively, so that the total contact area with the air is further increased, the heat transfer between the copper wires and the air is accelerated, and the rapid heat dissipation is thereby achieved. Of course, the copper wires can also be replaced by other metal wires, for example, aluminum braid, iron braid, graphene heat-conducting film and copper-iron alloy wire.

In addition, the metal sheet can also be used as the heat dissipation strip 32, the metal sheet can be thin copper, thin aluminum or thin copper aluminum alloy sheet, the metal sheet of this structure can also increase the contact area with the air to speed up heat dissipation. Of course, a plurality of heat dissipation holes (not shown) can be opened on the metal sheet, so that the heat dissipation effect can be further enhanced.

In the present embodiment, one end of each heat dissipation strip 32 is fixed to the fixing element 31; or alternatively a middle portion of each heat dissipation strip 32 in the longitudinal direction thereof is fixed to the fixing element 31. Particularly, if the length of the heat dissipation strip 32 is short, then one end thereof may be fixed on the fixing element 31, and if the length of the heat dissipation strip 32 is long, the middle portion of the heat dissipation strip 32 may be fixed on the fixing element 31, and then both ends of the heat dissipation strip 32 are radially distributed. The two manners can be set according to the automobile LED headlamps of different structures so as to be applicable to different automobile LED headlamps can be met.

As shown in FIG. 1 to FIG. 3, in thus present embodiment, the fixing element 31 comprises a fixing base 311 and a fixing cover 312, the fixing base 311 is fixedly connected with one end of the stem 10, and the fixing cover 312 is fixedly connected with the fixing base 311; each of the heat dissipation strips 32 locked and connected between the fixing base 311 and the fixing cover 312. Particularly, the fixing element 311 and the fixing cover 312 cooperate to form the fixing element 31, so that the heat dissipation strips 32 can be conveniently connected between the fixing base 311 and the fixing cover 312, that is, the fixing element 31 and the heat dissipation strips 32 are conveniently connected.

As shown in FIG. 2 to FIG. 3, in this present embodiment, one end of the stem 10 is provided with a threaded hole (not shown), one end of the fixing base 311 opposite to the fixing cover 312 is provided with a threaded post 3112, the threaded post 3112 is threadedly engaged into the threaded hole such that the fixing element 31 is fixedly attached to the stem 10. Particularly, the threaded post 3112 provided in the fixing base 311 is configured to connect with the threaded hole provided by the stem 10. In this way, the heat dissipation module 30 in this embodiment can be assembled on the stem 10. The threaded connection is very convenient for assembly and disassembly, which is good for maintenance and replacement of the heat dissipation module 30 in the later period, and is highly practical.

As shown in FIG. 3, in the present embodiment, the fixing cover 312 is provided with a riveting post 3121, the fixing base 311 is provided with a riveting hole 3111 of which the position corresponds to the position of the riveting post, the riveting post 3121 is inserted into the riveting hole 3111 and riveted with the riveting hole 3111 such that the fixing cover 312 is fixedly connected to the fixing base 311. Particularly, the riveting post 3121 is inserted into the riveting hole 3111 such that the fixing cover 312 is fixedly connected with the fixing base 311, which also facilitates the assembly and ensures the stability of the connection between the fixing cover 312 and the fixing base 311; and the connection between the fixing cover 312 and the fixing base 311 can be achieved without the use of external connectors to assist, the structure is simple, stable and reliable.

As shown in FIG. 3, in the present embodiment, the middle portion of the riveting post 3121 is provided with a through hole 3122 for a power line 50 extending therethrough. Particularly, the through hole 3122 is configured for the routing of the power line 50, such that the heat dissipation module 30 of the present embodiment can be installed without interfering with the mounting of the power line 50.

In this embodiment, each of the heat dissipation strips 32 is connected between the fixing base 311 and the fixing cover 312 by riveting, welding or fastener locking. Particularly, the stability of the connection between the fixing base 311 and the fixing cover 312 by riveting and welding is excellent, there is no necessary to worry about that the heat dissipation strips 32 would fall off from the connection with the fixing base 311 and the fixing cover 312 in a long-term use. While the fasteners are used to fix the heat dissipation strips 32 between the fixing base 311 and the fixing cover 312, the heat dissipation strips 32 can then be easily disassembled from the fixed cover 311 and the fixing cover 312 at a later stage, then, the heat dissipation strips 32 can be maintained or replaced. The two connection manners can be adopted according to requirements, such as, when applied to electronic products that generate high temperatures, a removable connection may be preferred; for applications in the electronic products that generate low temperatures, the connection more stable and solid can be used. The fastener can be a screw, a screw, a bolt, or the like.

Of course, in other embodiments, besides the three connection methods including riveting, welding and fastener locking, the heat dissipation strips 32 can be fixed between the fixed base 311 and the fixing cover 312 by means of adhesion using strong glue.

As shown in FIG. 1 to FIG. 2, in the present embodiment, the automobile LED headlamp further comprises a mounting bracket 40 configured for connecting with an external component, a mounting hole 41 is formed in the middle of the mounting bracket 40, the stem 10 passes through the mounting hole 41, and the mounting bracket 40 is fixedly connected with the stem 10 through a first fastener 1. Particularly, the mounting bracket 40 is configured to connect and fix other components besides the automobile LED headlamp, so as to realize the mounting of the automobile LED headlamp.

As shown in FIG. 1 to FIG. 2, in the present embodiment, a side of the stem 10 is provided with at least one recess 11, the LED module 20 comprises a substrate 21, and an LED array 22 and a control module 23 which are arranged on the substrate 21, the substrate 21 is arranged in the recess 11 and fixedly connected with the stem 10. Particularly, the recess 11 is configured to mount and fix the LED module 20. Wherein, the LED array 22 and the control module 23 can be welded on the substrate 21, the substrate 21 plays a role of arranging the circuit, and the control module 23 controls the switching of the luminosity of the LED array 22 to form a near-far light effect. When installing, the substrate 21 is placed in the recess 11 and locked on the stem 10, the mounting is convenient and simple, and the operation is convenient More particularly, there are preferably two recesses 11, and the two are symmetrically located in the stem 10. Correspondingly, two LED modules 20 are also mounted in the two recesses 11 respectively.

As shown in FIG. 1 to FIG. 2, in this application, the LED module 20 further comprises a fixing block 24, the fixing block abuts against the substrate 21 and fixedly connected to the stem 10 through a second fastener 2. Particularly, the number of the fixing block 24 is preferably two, fixing blocks 24 are abutted against the substrate 21 close to the end thereof along length direction, respectively, and fixing block 24 is locked on the stem 10 by the second fastener 2, in this way, the stability and reliability of the connection between the LED module 20 and the stem 10 are ensured.

In conclusion, it can be known that this application has the above-mentioned excellent characteristics and is thus of practical use in enhancing the unprecedented performance in the prior art and becoming a valuable product.

The aforementioned embodiments are only preferred embodiments of the present application, and are not intended for limiting the present application. Any modification, equivalent replacement, improvement, and so on, which are made within the spirit and the principle of the present application, should be included in the protection scope of the present application.

The invention claimed is:
1. An automobile LED headlamp, comprising: a stem and an LED module, wherein the LED module is mounted on the stem; the automobile LED headlamp further comprises a heat dissipation module, the heat dissipation module comprises a fixing element and a plurality of heat dissipation strips, the fixing element is fixedly connected to one end of the stem, the heat dissipation strips are fixed to the fixing element, and the heat dissipation strips are distributed radially, the fixing element comprises a fixing base and a fixing cover, the fixing base is fixedly connected with one end of the stem, and the fixing cover is fixedly connected with the fixing base; each of the heat dissipation strips is locked and connected between the fixing base and the fixing cover by riveting, a middle portion of each heat dissipation strip in the longitudinal direction thereof is fixed to the fixing element, and a plurality of heat dissipation strips are disposed in a stacked manner between the fixing base and the fixing cover.

2. The automobile LED headlamp of claim 1, wherein each of the heat dissipation strips is a metal braid strip or a metal sheet.

3. The automobile LED headlamp of claim 1, wherein one end of the stem is provided with a threaded hole, one end of the fixing base opposite to the fixing cover is provided with a threaded post, the threaded post is threadedly engaged into the threaded hole such that the fixing element is fixedly attached to the stem.

4. The automobile LED headlamp of claim 1, wherein the fixing cover is provided with a riveting post, the fixing base is provided with a riveting hole of which the position corresponds to the position of the riveting post, the riveting post is inserted into the riveting hole and riveted with the riveting hole such that the fixing cover is fixedly connected to the fixing base.

5. The automobile LED headlamp of claim 4, wherein the middle portion of the riveting post is provided with a through hole for a power line extending therethrough.

6. The automobile LED headlamp according to claim 1, wherein the automobile LED headlamp further comprises a mounting bracket configured for connecting with an external component, a mounting hole is formed in the middle of the mounting bracket, the stem passes through the mounting hole, and the mounting bracket is fixedly connected with the stem through a first fastener.

7. The automobile LED headlamp according to claim 1, wherein a side of the stem is provided with at least one recess, the LED module comprises a substrate and an LED array and a control module which are arranged on the substrate, the substrate is arranged in the recess and fixedly connected with the stem.

8. The automobile LED headlamp of claim 7, wherein the LED module further comprises a fixing block, the fixing block abuts against the substrate and fixedly connected to the stem through a second fastener.

9. The automobile LED headlamp of claim 7, wherein the number of the recesses is two, and the two recesses are distributed at symmetrical positions of the stem, the number of the LED modules is two, and the two LED modules are respectively mounted in the two recesses.

* * * * *